(12) United States Patent
Rimpler

(10) Patent No.: US 10,054,319 B2
(45) Date of Patent: Aug. 21, 2018

(54) SYSTEM FOR PRODUCING HOT WATER

(71) Applicant: Gerhard Rimpler, Neuzeug (AT)

(72) Inventor: Gerhard Rimpler, Neuzeug (AT)

( * ) Notice: Subject to any disclaimer, the term of this patent is extended or adjusted under 35 U.S.C. 154(b) by 217 days.

(21) Appl. No.: 14/901,414

(22) PCT Filed: Jun. 23, 2014

(86) PCT No.: PCT/AT2014/050138
§ 371 (c)(1),
(2) Date: Dec. 28, 2015

(87) PCT Pub. No.: WO2014/205468
PCT Pub. Date: Dec. 31, 2014

(65) Prior Publication Data
US 2016/0138813 A1    May 19, 2016

(30) Foreign Application Priority Data

Jun. 27, 2013    (AT) .................................. A 530/2013

(51) Int. Cl.
| | |
|---|---|
| *F24H 1/20* | (2006.01) |
| *F24H 9/20* | (2006.01) |
| *F24D 17/00* | (2006.01) |
| *F24H 9/18* | (2006.01) |
| *F24D 19/10* | (2006.01) |

(52) U.S. Cl.
CPC ..... *F24D 17/0068* (2013.01); *F24D 19/1051* (2013.01); *F24H 1/202* (2013.01); *F24H 9/1818* (2013.01); *F24H 9/2021* (2013.01); *F24D 2200/02* (2013.01); *F24H 2240/09* (2013.01); *Y02B 10/70* (2013.01)

(58) Field of Classification Search
None
See application file for complete search history.

(56) References Cited

U.S. PATENT DOCUMENTS

| | | | |
|---|---|---|---|
| 4,447,712 A | 5/1984 | Covillion | |
| 5,293,447 A * | 3/1994 | Fanney | F24D 19/1057 |
| | | | 136/248 |
| 6,363,218 B1 * | 3/2002 | Lowenstein | H05B 1/0283 |
| | | | 392/498 |
| 8,897,632 B2 * | 11/2014 | Flohr | F24H 9/2021 |
| | | | 392/441 |
| 8,977,117 B2 * | 3/2015 | Kreutzman | H05B 3/82 |
| | | | 29/890.031 |

(Continued)

FOREIGN PATENT DOCUMENTS

| | | |
|---|---|---|
| DE | 202010008307 U1 | 11/2011 |
| DE | 202012102677 U1 | 8/2012 |

(Continued)

*Primary Examiner* — Thor Campbell
(74) *Attorney, Agent, or Firm* — FisherBroyles, LLP

(57) ABSTRACT

The invention relates to a system for producing hot water, comprising a hot water reservoir, a first and a second resistance heating rod for heating the water in the hot water reservoir, a reservoir temperature sensor, and a control unit, by means of which the first resistance heating rod can be connected to a network alternating voltage source, wherein the system comprises a photovoltaic device for producing a direct voltage and the photovoltaic device can be connected to the second resistance heating rod by means of the control unit or a further control unit.

17 Claims, 3 Drawing Sheets

(56) References Cited

U.S. PATENT DOCUMENTS

| | | | | |
|---|---|---|---|---|
| 2009/0214195 A1* | 8/2009 | Thomasson | ........... | F24D 11/003 |
| | | | | 392/451 |
| 2013/0266296 A1* | 10/2013 | Kreutzman | ......... | F24D 19/1048 |
| | | | | 392/308 |
| 2013/0266300 A1* | 10/2013 | Kreutzman | .............. | H05B 3/82 |
| | | | | 392/501 |
| 2014/0112647 A1* | 4/2014 | Lichtenberger | ......... | F24H 1/202 |
| | | | | 392/308 |
| 2014/0153913 A1* | 6/2014 | Newman | ............ | F24D 19/1057 |
| | | | | 392/451 |

FOREIGN PATENT DOCUMENTS

| | | | |
|---|---|---|---|
| EP | 2402678 | A2 | 1/2012 |
| GB | 2457139 | A | 8/2009 |
| WO | 2011073938 | A2 | 6/2011 |

* cited by examiner

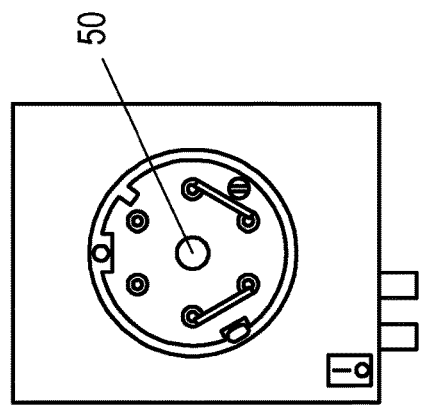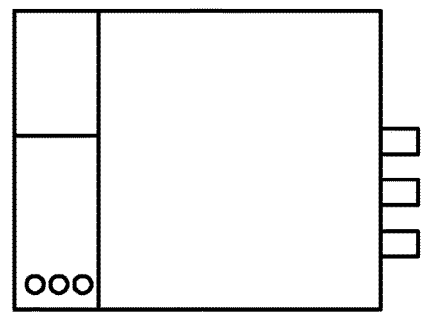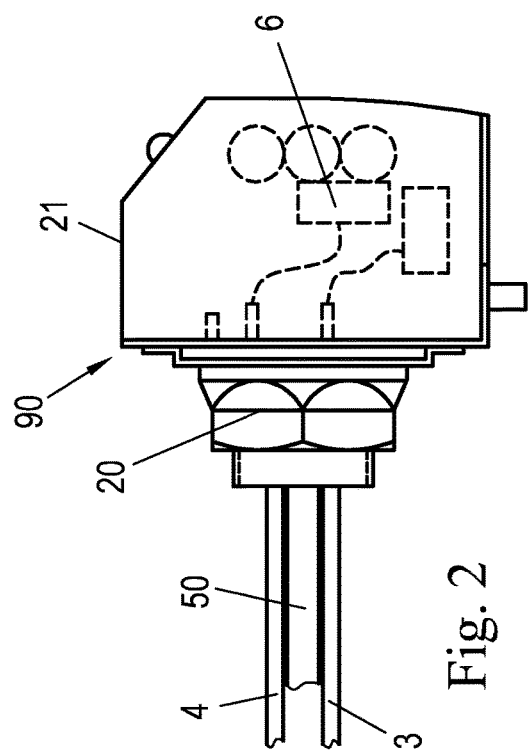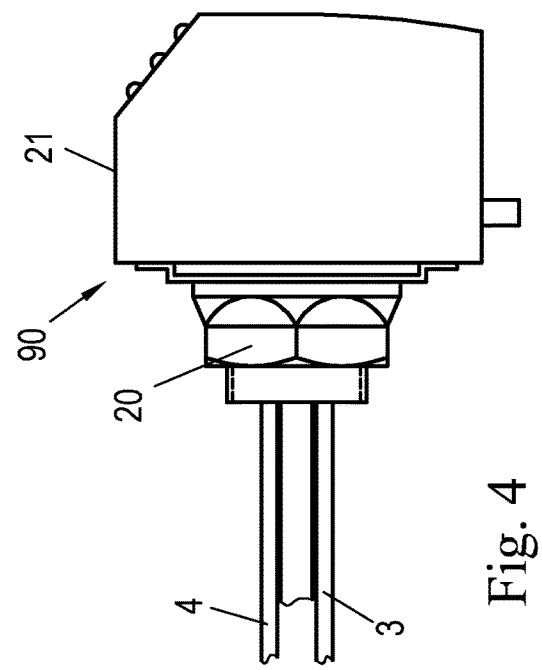

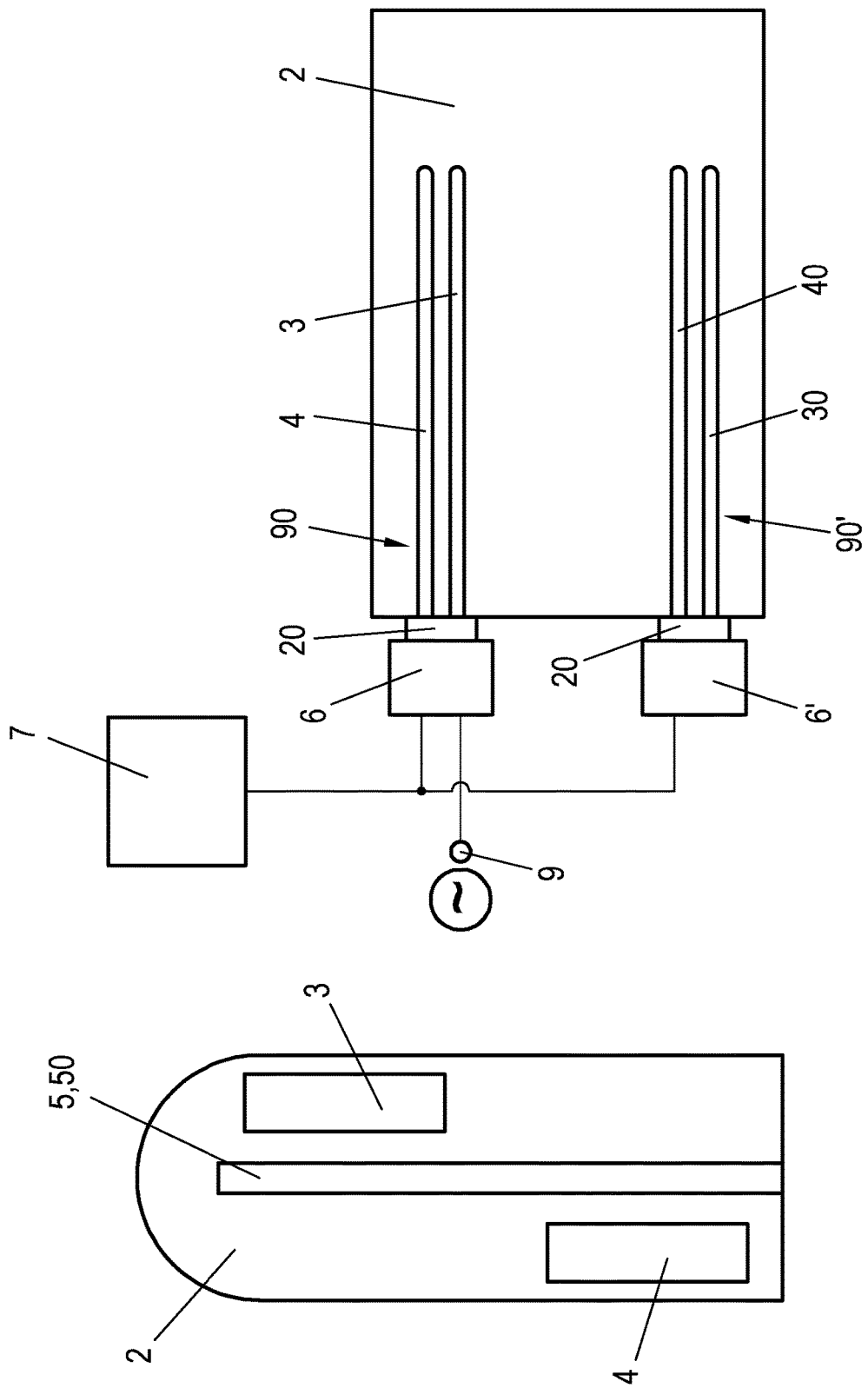

SYSTEM FOR PRODUCING HOT WATER

The invention relates to a system for hot water generation having a hot water storage tank and at least one first and at least one second resistive heating rod to heat the water located in the hot water storage tank, as well as a storage tank temperature sensor and a control unit by which the at least one first resistive heating rod is connectable to an AC line voltage source.

During the last few years, the de-centralized generation of energy and its feeding into public networks has gained increasing public attention, with the conversion of solar radiation into heat or electrical energy having reached a high level of significance, but at the same time being subject to strong fluctuations, which may result in highly variable network loads causing problems in networks which are not designed therefor.

Typically, photovoltaic systems convert a DC voltage into an AC voltage to enable various electrical loads or devices to be operated, or to feed the generated AC voltage into the public network.

Although this form of energy generation presents a large number of advantages to the user, the AC conversion of the photovoltaically generated DC voltage requires a system which carries corresponding costs. In addition, some conversion losses will occur.

In the field of hot water generation, solar radiation may be utilized in a highly advantageous way, however with systems having solar collectors in combination with a heat exchanger requiring a relatively complex installation.

Furthermore, in contrast to photovoltaic modules, solar collectors have a low level of efficiency in low ambient temperatures.

Thus, it is the purpose of the invention to disclose a system of the initially mentioned type, which offers a possibility to supply electrical energy generated from solar energy conversion with relatively simple means while achieving a high level of efficiency.

A further purpose of the invention is to disclose a system which enables existing systems to be upgraded without much effort.

According to the invention, this is achieved by the system comprising a DC voltage generating photovoltaic device and by the photovoltaic device being connectable to the at least one second resistive heating rod by the control unit and, optionally, at least one further control unit.

At least two resistive heating rods are required for the implementation of the invention, one of which is operated with an AC line voltage and the other of which is operated with direct current from the photovoltaic conversion. As there are, for example, hot water boilers having three separate heating rods to be driven by three-phase alternating current, these or other heating rods specifically manufactured for this purpose may be used. For this reason, besides providing a suitable control unit, it is only necessary to provide a supply line via a bipolar cable, e.g. from the rooftop photovoltaic element to the heating rod of the hot water storage tank. This can be done at relatively low cost.

A further advantage of the invention is the direct conversion of electrical energy into heat energy without prior AC conversion and the losses related thereto. This way, a photovoltaic device may be switched to stand-alone operation without an inverter. The energy generated from solar radiation is exclusively used for hot water generation and is not fed into a network in case of a surplus. Thus, the usage of the energy required for hot water generation, which is made up of solar-generated and network-fed portions, can be very well adjusted to the typical hot water consumption of a consumer as will be discussed below.

As a further measure to develop the invention, it may be intended that the at least one resistive heating rod and the AC line source are galvanically separated from the at least one second resistive heating rod, whereby it is possible on the one hand to separate the AC voltage circuit and the DC voltage circuit, which is required as a safety measure, and on the other hand to achieve completely independent control of both separate heating rods.

Specifically, to this aim the at least one first resistive heating rod, the at least one second resistive heating rod, the metal sheathing of the resistive heating rods and the attachment flange may be insulated from one another.

In one further embodiment of the invention, the at least first and the at least second resistive heating rods may be attached to a common attachment flange and form a heating cartridge, which, in the attached state, protrudes into the hot water storage tank. This construction type allows an existing heating rod in a hot water storage tank to be easily replaced by two heating rods constructed according to the invention.

Furthermore, according to another embodiment of the invention it may be intended that the control unit is arranged in a housing which is connected to the attachment flange preferably at the outside of the hot water storage tank or integrally formed therewith.

Such an arrangement of the control unit in close vicinity to the heating rods offers the advantage of requiring little space, with the result that no attachment is required on or in a wall, and further external cabling or wiring from the heating rods to the control unit may be omitted.

The arrangement of the heating rods within the hot water storage tank may vary within the invention. However, for logical reasons the electricity generated from solar energy will serve the purpose of pre-heating the water and the required additional electricity will be drawn from the AC line voltage.

In accordance with a further embodiment of the invention, the hot water storage tank may comprise an upper and a lower part, with the first resistive heating rod being arranged to generate heat in the upper part of the hot water storage tank and the second resistive heating rod being arranged to generate heat in the lower part of the hot water storage tank.

According to another variation of the invention it may be intended that one first heating cartridge and one second heating cartridge are formed with one first heating rod each, one second heating rod each and one control unit each, and that the first heating cartridge is arranged in an upper part of the hot water storage tank and the second heating cartridge is arranged in a lower part of the hot water storage tank, with the second resistive heating rod of the first heating cartridge and the second resistive heating rod of the second heating cartridge being connectable to the photovoltaic device, with the first heating cartridge being arranged so as to generate heat in the upper part of the hot water storage tank and the second heating cartridge being arranged so as to generate heat in the lower part of the hot water storage tank.

Hence, heating cartridges of identical construction may be arranged in the upper and lower parts of the hot water storage tank, wherein pre-heating through the photovoltaic device may optionally take place in the upper part or in the lower part, whereby the supply of heat may therefore be better adjusted if post-heating is required.

In this context, the control units of the first and second heating cartridges may be provided with a detection unit configured to monitor the output voltage of the photovoltaic device and, by analysis of the same, to determine that the second resistive heating rod of the second heating cartridge is connected, with the control unit of the first heating cartridge and the control unit of the second heating cartridge having controlled switches and actuating these to preferentially conduct solar electricity from the photovoltaic device into the second resistive heating rod of the upper first heating cartridge and only then conduct it into the lower second resistive heating rod of the second heating cartridge, and the control unit having further switches that are actuable to optionally provide post-heating through the AC supply via the first resistive heating rod of the first heating cartridge.

In this way, the automatic layer charging thus achieved is exclusively regulated via the common DC voltage line of the respective second resistive heating rod of both heating cartridges without further communication interfaces between the heating rods.

The supply of energy from the conversion of solar radiation on the one hand and from the AC line voltage on the other hand is controlled by the control unit in such a way as to keep the amount of AC line voltage as small as possible to minimize the consumption of network electricity. In this way, pre-heating with photovoltaic electricity and post-heating with AC line current may therefore be combined at low cost.

In this way, photovoltaic electricity is directly converted into heat energy, which may be supplemented by heat generation from the line current.

To this aim, the control unit may be configured to connect the AC voltage source to the first resistive heating rod via the switch within a post-heating period, with the beginning and the end of the post-heating period being controllable depending on the temperature achieved in the hot water storage tank during the pre-heating period.

In a further embodiment of the invention, the control unit may be equipped with control circuitry, a switching logic for heating the hot water tank in accordance with the values of the storage tank temperature sensor, switching elements and an actuating device for regulating the feeding circuits formed by the photovoltaic device and the AC line voltage source.

In an especially preferred way, the control unit may be equipped with control circuitry, which maximizes the power adjustment between the photovoltaic device and the second resistive heating rod by continuously analyzing the current/voltage changes of the photovoltaic device and optimizing actuation of a switching means. This may be done, in the known manner, through MPP tracking.

Thus, according to a further development of the invention, the control unit can be configured in each case so as to connect the photovoltaic device to either the second resistive heating rod of the first heating cartridge or the second resistive heating rod of the second heating cartridge via the controlled switches within a pre-heating period under solar exposure, and, if a maximum temperature within the hot water storage tank is exceeded, the control unit may be configured in each case so as to disconnect the photovoltaic device and the respective second resistive heating rod.

Furthermore, the control unit may include a communication interface for remote data retrieval and/or maintenance as well as display elements, through which a test or check of the system according to the invention may be carried out remotely.

The invention also relates to a method for controlling a system according to the invention, which consists in that the water temperature is recorded in the control unit throughout the day, the typical hot water extraction throughout the day is calculated therefrom, and the hot water storage tank is pre-heated and optionally post-heated according to the typical hot water extraction.

In this context, it may further be intended that the storage tank temperature sensor monitors the water temperature and, if a predefined temperature threshold is exceeded, especially due to calcification of the heating cartridge, will output a failure notification, and that the system will be switched off immediately or only after a second temperature threshold is exceeded.

One further embodiment of the method according to the invention and the system according to the invention may comprise that during operation, the galvanic separation between the feeding circuits is monitored by insulation test circuitry between the second resistive heating rod and the ground potential and between the photovoltaic device and the ground potential and that, in case the insulation resistance falls below a predefined value, both feeding circuits or only one of them will be switched off and/or a failure notification will be output.

Below, the invention will be explained in detail with regard to the exemplary embodiments depicted in the drawings. In these, FIG. 1 shows a circuit diagram of one embodiment of the system according to the invention and FIG. 2 shows a partly cutaway lateral view of a heating cartridge of a further embodiment of the system according to the invention;

FIG. 3 shows a front view of the heating cartridge according to FIG. 2 with the housing cover having been removed;

FIG. 4 shows a lateral view of the heating cartridge according to FIG. 2;

FIG. 5 shows a front view of the heating cartridge according to FIG. 2;

FIG. 6 shows a schematic representation of a hot water storage tank of a further embodiment of the system according to the invention and FIG. 7 shows a circuit diagram of a further embodiment of the system according to the invention.

Figure 1:
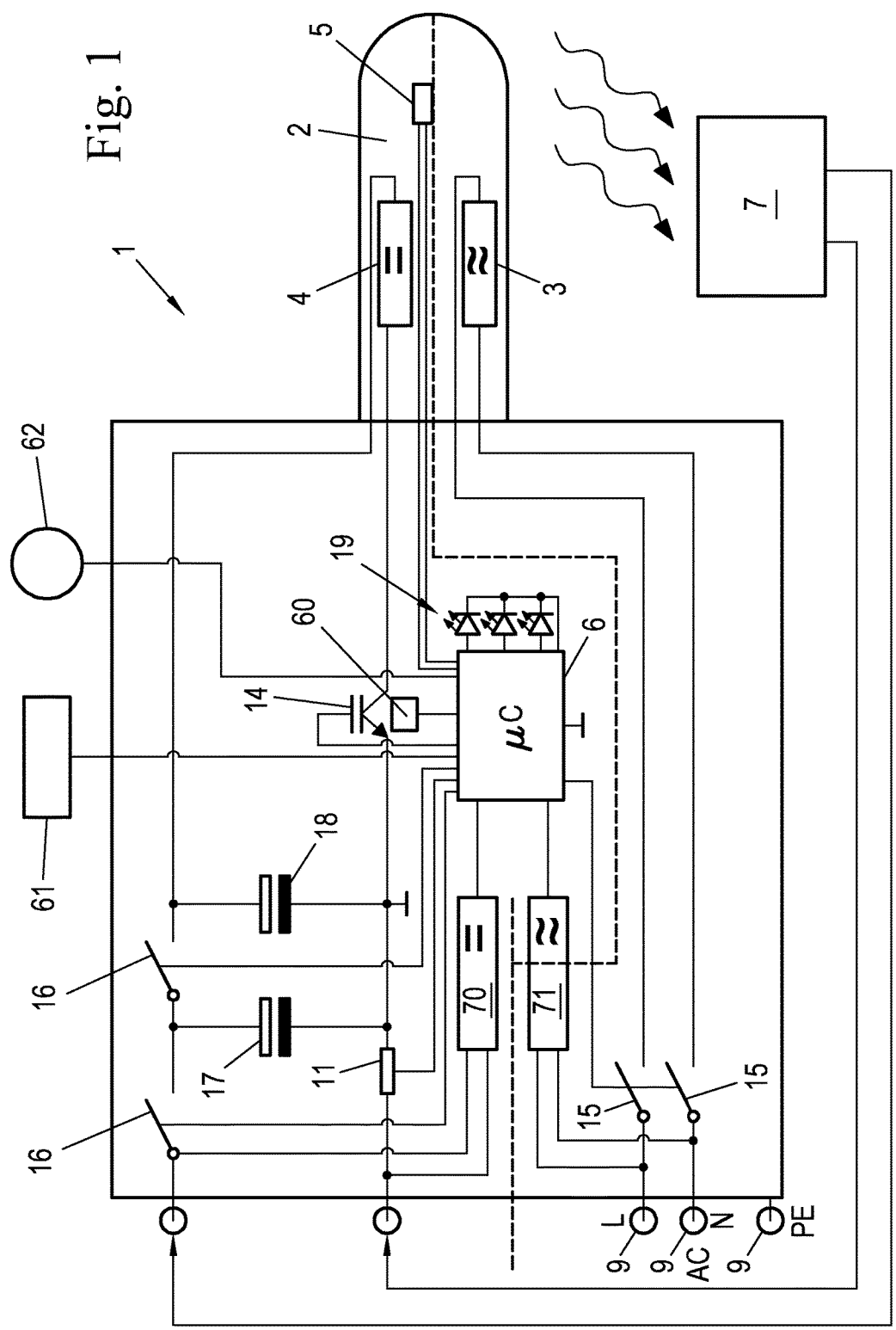

FIG. 1 shows the circuit diagram of a system 1 for hot water generation with a hot water storage tank 2 and one first and one second resistive heating rod 3, 4 for heating the water located in the hot water storage tank 2. Furthermore, a storage tank temperature sensor 5 and a control unit 6 with a status display 19 and on and off switches 61 are provided.

Furthermore, the control unit 6 includes a communication interface 62 for remote data retrieval and/or maintenance.

The first resistive heating rod 3 is operated by AC line voltage and is connectable to an AC line voltage source 9 via two switches 15, which are controlled by the control unit 6, e.g. a micro controller.

According to the invention, the system 1 comprises a photovoltaic device for generating a DC voltage 7, by which incident solar radiation is converted into electrical energy.

The control unit 6 is supplied with electricity either by a DC current supply 7 or by a network-fed AC supply 9 depending on solar exposure.

The photovoltaic device 7 is connected to the second resistive heating rod 4 via controlled switches 16, which are controlled by the control unit 6 or another control unit, and capacitors 17, 18, which allow for an MPP adjustment. The current flowing through the second resistive heating rod 4 is controlled by a current shunt 11, which is connected to the control unit 6, and a transistor or other electronic switching means 14.

In addition, the first resistive heating rod 3 and the AC line voltage source 9 are galvanically separated from the second resistive heating rod 4.

During solar exposure, the photovoltaic device 7 is connected to the second resistive heating rod 4 within the pre-heating period in such a way as that there is a power adjustment between the photovoltaic device and the heating rod.

The power adjustment between the photovoltaic device 7 and the second resistive heating rod 4 is effected in the control unit by analyzing the current/voltage characteristics of the photovoltaic modules and by regulating them in such a way as to maximize the power output of the solar panels.

If a maximum temperature within the hot water storage tank 2 is exceeded, the connection between the photovoltaic device 7 and the second resistive heating rod 4 is interrupted, and the feed-in of further photovoltaic electricity is prevented.

The storage tank temperature sensor 5 continuously measures and monitors the hot water temperature and forwards the measurements to the control unit 6. In case of failure, the storage tank temperature sensor 5 will output a failure notification, for example if a pre-defined temperature threshold is exceeded, especially due to calcification of the heating cartridge, whereupon the system will be switched off immediately or only after a second temperature threshold has been exceeded.

The control unit 6 is equipped with a control circuitry, a switching logic for heating the hot water tank 2 in accordance with the values of the storage tank temperature sensor 5, switching elements and an actuating device for regulating the feeding circuits formed by the photovoltaic device 7 and the AC voltage source 9.

If the control unit 6 detects that heat generation is too low, the AC line voltage source 9 will be connected to the first resistive heating rod 3 by the control unit 6 within a post-heating period, with the beginning and the end of the post-heating period being controllable depending on the temperature achieved in the hot water storage tank during the pre-heating period.

Preferably, the water temperature is recorded in the control unit 6 throughout the day, the typical hot water extraction throughout the day is calculated therefrom, and the hot water storage tank 2 is pre-heated and optionally post-heated according to the typical hot water extraction.

Furthermore, during operation the galvanic separation between the feeding circuits 7, 9 is monitored by insulation test circuitry in the control unit between the second resistive heating rod or the photovoltaic device 7, respectively, and the ground potential, and in case the insulation resistance falls below a pre-defined value, both feeding circuits 7, 9 or only one of them will be switched off and/or a failure notification will be output.

FIGS. 2 to 5 show a further exemplary embodiment, wherein the first and the second resistive heating rods 3, 4 are attached to a common attachment flange 20 and form a heating cartridge 90, which, in the attached state, protrudes into the hot water storage tank (not depicted). A measuring tube 50, which includes the temperature sensor 5 for measuring the water temperature inside the hot water storage tank (not depicted), is arranged at the first and the second heating rods 3, 4.

The first resistive heating rod 3, the second resistive heating rod 4, the metal sheathing of the resistive heating rods 3, 4 and the attachment flange 20 are insulated from one another.

The metal sheathings of the resistive heating rods 3, 4 are connected to the ground potential either directly or via a low Ohmic resistance, which is advantageous with regard to galvanic corrosion.

The heating cartridge may be mounted in the hot water storage tank 2 using a 1.5 inch or 1.25 inch threading or a 180 mm flange plate or other common attachment means.

The control unit 6 is arranged in a housing 21, which is connected to the attachment flange 20 on the outside of the hot water storage tank (not depicted).

According to the exemplary embodiment shown in FIG. 6, the hot water storage tank 2 has distinct upper and lower parts, with the first network-fed resistive heating rod 3 being arranged so as to generate heat in the upper part of the hot water storage tank 2 and the lower resistive heating rod 4, which is fed by the photovoltaic device 7, being arranged so as to generate heat in the lower part of the hot water storage tank 2.

Basically, it is sought to generate heat using the electricity of the photovoltaic device 7. To achieve this, the highest possible degree of photovoltaic energy utilization is to be sought. This may be accomplished by:

1. reasonable dimensioning of the photovoltaic device 7 as compared to the storage volume of the hot water storage tank 2;

2. intelligent auxiliary or post-heating using AC line voltage, which prevents the storage tank from having an excessively high temperature at the beginning of the day;

3. layer charging, wherein first a small (upper) portion of the hot water storage tank 2 is heated, then—if the photovoltaic device 2 delivers energy—the lower portion of the hot water storage tank 2 is heated, and, if the upper storage tank temperature is insufficient, auxiliary heating is provided by the AC line voltage;

4. optimized power adjustment between the photovoltaic device 2 and the second resistive heating rod 4 by regulating the photovoltaic device 2 according to the current/voltage characteristics.

During auxiliary heating, not only is information on photovoltaic power and the threshold temperature to be reached taken into account, but also is the user's consumption behavior calculated from the temperature changes.

Furthermore, the course of the sun and the approximate time of day are calculated from the photovoltaic power averaged over several days.

If there is, for example, a consumption behavior wherein a lot of hot water is required in the evening and little in the morning, auxiliary heating is provided in the evening prior to the consumption time instead of in the morning. Thereby, there is a relatively low storage tank temperature during the night and hence there are low losses and thus there is a favorable initial temperature for the forthcoming heat generation by the photovoltaic device 7 on the next day.

If the consumption behavior is more pronounced in the morning, auxiliary heating is provided prior to the morning consumption, which results in a favorable initial temperature for the forthcoming heat generation from photovoltaic electricity after the morning consumption.

The previously mentioned objects may, for example, be accomplished with the exemplary embodiment shown in FIG. 7.

One first heating cartridge 90 is connected to one first resistive heating rod 3 and one second resistive heating rod 4, and a second heating cartridge 90' is connected to one first resistive heating rod 30 and a second resistive heating rod 40, and each of them is connected to a control unit 6, 6'.

The control units 6, 6' are equipped with a control circuitry, a switching logic for heating the hot water tank 2 in accordance with the values of the storage tank temperature sensor 5, switching elements and an actuating device for regulating the feeding circuits formed by the photovoltaic device 7 and the AC line voltage source 9.

Furthermore, the control units 6, 6' are equipped with a control circuitry, which maximizes the power adjustment between the photovoltaic device 7 and the second resistive heating rod 4 by continuously analyzing the current/voltage changes of the photovoltaic device 7 and optimizing actuation of a switching means 14.

The first heating cartridge 90 is arranged in an upper part of the hot water storage tank 2, and the second heating cartridge 90' is arranged in a lower part of the hot water storage tank 2.

The second resistive heating rod 4 of the first heating cartridge 90 and the second resistive heating rod 40 of the second heating cartridge 90' may be connected to the photovoltaic device 7 via control units 6, 6', with the first heating cartridge 90 being arranged to generate heat in the upper part of the hot water storage tank 2 and the second heating cartridge 90' being arranged so as to generate heat in the lower part of the hot water storage tank 2.

The presence of the second heating cartridge 90' may be detected by the control unit 6 using a detection unit, which is not depicted and configured to monitor the output voltage of the photovoltaic device 7 and, through analysis thereof, to determine that the second resistive heating rod 40 of the second heating cartridge 90' is connected.

The control units 6, 6' have controlled switches 16 and actuate them to preferentially conduct solar electricity from the photovoltaic device 7 into the second resistive heating rod 4 of the upper first heating cartridge 90, whereby they heat an upper water layer in the hot water storage tank. Only then is solar electricity conducted from the photovoltaic device 7 into the lower second resistive heating rod 40 of the second heating cartridge 90'.

Furthermore, the control unit 6 has switches 15 that are actuable to optionally provide post-heating through the AC supply 9 via the first resistive heating rod 3 of the first heating cartridge 90.

Hence, within a pre-heating period during solar exposure, the photovoltaic device 7 is either connected to the second resistive heating rod 4 of the first heating cartridge 90 or to the second resistive heating rod 40 of the second heating cartridge 90', with the connection between the photovoltaic device 7 and the second resistive heating rod 4 being interrupted if a maximum temperature within the hot water storage tank 2 is exceeded.

If post-heating by the AC supply 9 is required or the desired upper temperature has already been reached, the electricity from the photovoltaic device 7 is conducted to the lower second resistive heating rod 40 of the second heating cartridge 90', where a lower water layer is heated.

At the same time, post-heating is provided by the first resistive heating rod 3 of the first heating cartridge through the AC voltage supply 9 during the post-heating period, with the AC voltage source 9 being connected to the first resistive heating rod 3 of the first heating cartridge 90 within the post-heating period by the control unit 6, and with the beginning and the end of the post-heating period being controllable depending on the temperature in the hot water storage tank 2 achieved in the pre-heating period.

I claim:

1. A system for hot water generation comprising:
   a hot water storage tank;
   at least one first and at least one second resistive heating rods for heating the water located in the hot water storage tank;
   a storage tank temperature sensor;
   a control unit through which the at least one resistive heating rod is connectable with an AC line voltage, wherein the control unit is arranged in a housing integrally formed with the hot water storage tank or connected to an attachment flange at the outside of the hot water storage tank; and
   a photovoltaic device for generating a DC voltage, wherein the photovoltaic device is connectable with the at least one second resistive heating rod through the control unit to provide the primary heating source for the hot water storage tank.

2. The system according to claim 1, wherein the at least one resistive heating rod and the AC line current source are galvanically separated from the at least one second resistive heating rod.

3. The system according to claim 1, wherein the at least one first and the at least one second resistive heating rods are attached to the attachment flange and form a heating cartridge, which, in the attached state, protrudes into the hot water storage tank.

4. The system according to claim 1, wherein the hot water storage tank comprises an upper and a lower part, the first resistive heating rod being arranged so as to generate heat in the upper part and the second resistive heating rod being arranged to generate heat in the lower part of the hot water storage tank.

5. The system according to claim 1, wherein one first heating cartridge and one second heating cartridge are formed with one first, one second resistive heating rod each and one control unit each, and that the first heating cartridge is arranged in an upper part of the hot water storage tank and the second heating cartridge in a lower part of the hot water storage tank, the second resistive heating rod of the first heating cartridge and the second resistive heating rod of the second heating cartridge being connectable with the photovoltaic device, the first heating cartridge being arranged so that said heat is generated in the upper part of the hot water storage tank and the second heating cartridge being arranged that said heat is generated in the lower part of the hot water storage tank.

6. The system according to claim 5, wherein a detection unit configured to monitor the output voltage of the photovoltaic device and, by monitoring thereof, to determine that the second resistive heating rod of the second heating cartridge is connected, is provided in the control unit or in the control unit, with the control unit and the control unit having controlled switches and actuating these to preferentially conduct solar electricity from the photovoltaic device into the second resistive heating rod of the upper first heating cartridge and only then conduct it into the lower second resistive heating rod of the second heating cartridge, and the control unit having further switches that are actuable to optionally provide post-heating through the AC supply via the first resistive heating rod of the first heating cartridge.

7. The system according to claim 5, wherein the control unit and the control unit are configured to connect the photovoltaic device to either the second resistive heating rod of the first heating cartridge or the second resistive heating rod of the first heating cartridge via the controlled switches within a pre-heating period during solar exposure, and that the control unit and/or the control unit are configured to interrupt the connection between the photovoltaic device and the respective second resistive heating rod if the maximum temperature within the hot water storage tank is exceeded.

8. The system according to claim 1, wherein the control unit is configured to connect the AC line voltage source to the first resistive heating rod via the switch within a post-heating period, with the beginning and the end of the post-heating period being controllable depending on the temperature achieved in the hot water storage tank during a pre-heating period.

9. The system according to claim 1, wherein the control unit is equipped with control circuitry, a switching logic for heating the hot water tank in accordance with the values of the storage tank temperature sensor, switching elements and an actuating device for regulating the feeding circuits formed by the photovoltaic device and the AC line voltage source.

10. The system according to claim 1, wherein the control unit is equipped with regulatory circuitry, which maximizes the power adjustment between the photovoltaic device and the second resistive heating rod by continuously analyzing the current/voltage changes of the photovoltaic device and optimizing actuation of a switching means.

11. The system according to claim 1, wherein the control unit includes a communication interface for remote data retrieval and/or maintenance as well as display elements.

12. The system according to claim 1, wherein each of the at least one first and at least one second resistive heating rods is attached to the attachment flange and has a metal sheathing, and wherein the at least one first resistive heating rod, the at least one second resistive heating rod, the metal sheathing of the resistive heating rods and the attachment flange are insulated from one another.

13. The system according to claim 3, wherein the heating cartridge is mounted in the hot water storage tank using a 1.5 or 1.25 inch threading or a 180 mm flange plate.

14. A method for controlling a system according to claim 1, wherein the water temperature is recorded in the control unit throughout the day, the typical hot water extraction throughout the day is calculated therefrom, and the hot water storage tank is pre-heated and optionally post-heated according to the typical hot water extraction.

15. The method according to claim 1, wherein the storage tank temperature sensor monitors the water temperature, outputs a failure notification if a pre-defined temperature threshold is exceeded, and switches the system off immediately or after a second temperature threshold has been exceeded.

16. The method according to claim 1, wherein the AC line voltage feeding the at least one first resistive heating rod and the photovoltaic device feeding the at least one second resistive heating rod are galvanically separated, and wherein the galvanic separation between the feeding circuits is monitored during operation by insulation test circuitry between the second resistive heating rod and the ground potential and between the photovoltaic device and the ground potential and that, in case the insulation resistance falls below a predefined value, both feeding circuits or only one of them will be switched off and/or a failure notification will be output.

17. The system according to claim 1 further comprising at least one further control unit.

* * * * *